United States Patent
Goyal et al.

(10) Patent No.: US 11,927,493 B2
(45) Date of Patent: Mar. 12, 2024

(54) TEMPERATURE SENSOR

(71) Applicant: NXP B.V., Eindhoven (NL)

(72) Inventors: Saurabh Goyal, Sonipat (IN); Sanjay Kumar Wadhwa, Noida (IN); Firas N. Abughazaleh, Austin, TX (US); Atul Kumar, Delhi (IN)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 17/644,212

(22) Filed: Dec. 14, 2021

(65) Prior Publication Data

US 2023/0184594 A1 Jun. 15, 2023

(51) Int. Cl.
*G01K 7/01* (2006.01)
*G01K 7/25* (2006.01)

(52) U.S. Cl.
CPC ............ *G01K 7/25* (2013.01); *G01K 7/01* (2013.01)

(58) Field of Classification Search
None
See application file for complete search history.

(56) References Cited

U.S. PATENT DOCUMENTS

| | | | |
|---|---|---|---|
| 7,686,508 B2* | 3/2010 | Lin | G01K 7/015 |
| | | | 374/170 |
| 10,386,243 B2 | 8/2019 | Abughazaleh et al. | |
| 10,712,210 B2 | 7/2020 | Coimbra et al. | |
| 11,112,816 B2* | 9/2021 | Bass | G01K 7/01 |
| 11,674,855 B2* | 6/2023 | Singh | H03M 1/0604 |
| | | | 374/170 |
| 2007/0237207 A1 | 10/2007 | Aslan et al. | |
| 2014/0314124 A1 | 10/2014 | Ash et al. | |
| 2015/0117495 A1 | 4/2015 | Tiruvuru et al. | |
| 2020/0129770 A1 | 4/2020 | Opris et al. | |

OTHER PUBLICATIONS

Khadouri et al., "A smart CMOS interface system for thermo-couples", Quality Measurement: The Indispensable Bridge between Theory and Reality (No Measurements? No Science! Joint Conference—1996: IEEE Instrumentation and Measurement Technology Conference and IMEKO Tec, Jun. 4-6, 1996, IEEE, Brussels, Belgium.

Pertijs et al., "A CMOS smart temperature sensor with a 3/spl sigma/ inaccuracy of /spl plusmn/0.1/spl deg/C from −55/spl deg/C to 125/spl deg/C", IEEE Journal of Solid-State Circuits, Dec. 5, 2005, 11 pages, vol. No. 40, Issue No. 12, IEEE.

* cited by examiner

*Primary Examiner* — Jeffery S Zweizig

(57) ABSTRACT

A temperature sensor includes a sensing element and a load. Multiple different currents pass through the sensing element in a sequential manner. Based on each current that passes through the sensing element, the sensing element outputs a complementary-to-absolute-temperature (CTAT) voltage and another current. Further, the currents that pass through the sensing element and the currents that the sensing element output separately pass through the load and result in the generation of multiple load voltages across the load. A current density ratio of the temperature sensor is determined based on the load voltages generated across the load. Further, a temperature value indicative of a temperature sensed by the temperature sensor is generated based on the current density ratio and the CTAT voltages outputted by the sensing element based on the different currents that pass therethrough.

20 Claims, 5 Drawing Sheets

TEMPERATURE SENSOR

FIELD OF USE

The present disclosure relates generally to electronic circuits, and, more particularly, to a temperature sensor.

BACKGROUND

An integrated circuit (IC) typically includes various electronic components, such as a multi-core processor, a math accelerator, or the like. Such electronic components dissipate a significant amount of heat which leads to an increase in the temperature of the IC. If the increased temperature remains unchecked, the IC may be damaged.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
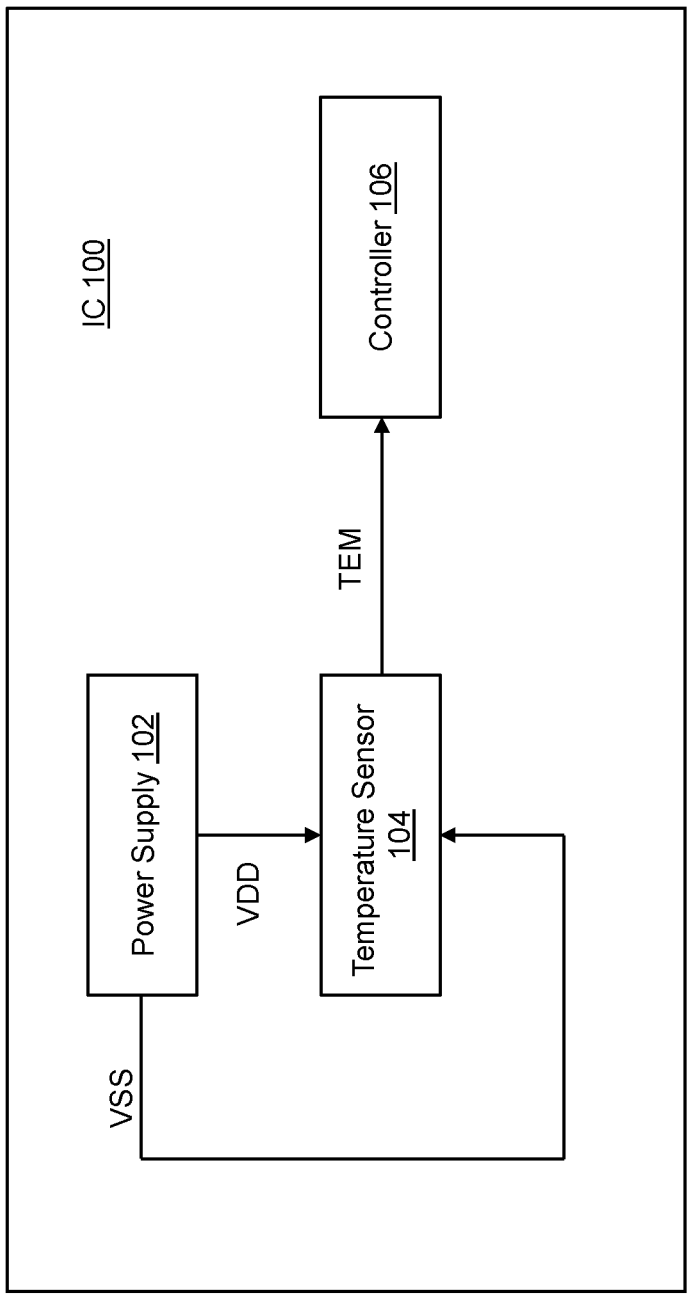
FIG. 1 illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, a temperature sensor is disclosed. The temperature sensor may include a sensing element and a load. The sensing element may be configured to output, based on a first plurality of currents that passes through the sensing element, a plurality of complementary-to-absolute-temperature (CTAT) voltages and a second plurality of currents. Each current of the first plurality of currents is different. Further, the load may be coupled to the sensing element, and has the first plurality of currents and the second plurality of currents pass therethrough. A plurality of load voltages is generated across the load based on the first plurality of currents and the second plurality of currents. A current density ratio of the temperature sensor is determined based on the plurality of load voltages. Further, a temperature value indicative of a temperature sensed by the temperature sensor is generated based on the current density ratio and the plurality of CTAT voltages.

In another embodiment of the present disclosure, a temperature sensing method is disclosed. The temperature sensing method may include controlling, by an enabling circuit of a temperature sensor, a switching circuit of the temperature sensor to operate in a plurality of states. Further, the temperature sensing method may include outputting, by a sensing element of the temperature sensor, based on a first plurality of currents that passes through the sensing element when the switching circuit operates in two or more states of the plurality of states, a plurality of CTAT voltages and a second plurality of currents. Each current of the first plurality of currents is different. When the switching circuit operates in the plurality of states, the first plurality of currents and the second plurality of currents pass through a load of the temperature sensor, and a plurality of load voltages is generated across the load. A current density ratio of the temperature sensor is determined based on the plurality of load voltages. Further, a temperature value indicative of a temperature sensed by the temperature sensor is generated based on (i) the current density ratio and (ii) the plurality of CTAT voltages.

In some embodiments, the first plurality of currents may include a first current and a second current that is different from the first current. The sensing element may output a first CTAT voltage and a third current based on the first current that passes through the sensing element. Similarly, the sensing element may output a second CTAT voltage and a fourth current based on the second current that passes through the sensing element. A first load voltage, a second load voltage, a third load voltage, and a fourth load voltage are generated across the load based on the third current, the first current, the fourth current, and the second current that pass through the load, respectively. The plurality of CTAT voltages may include the first CTAT voltage and the second CTAT voltage, and the second plurality of currents may include the third current and the fourth current. Further, the plurality of load voltages may include the first load voltage, the second load voltage, the third load voltage, and the fourth load voltage. The temperature value is generated based on the current density ratio and a difference between the second CTAT voltage and the first CTAT voltage.

In some embodiments, the temperature sensor may further include a switching circuit that may be coupled to the sensing element and the load. When the switching circuit operates in a first state, the first current passes through the sensing element, and the sensing element outputs the first CTAT voltage and the third current based on the first current. Further, the third current passes through the load, and the first load voltage is generated across the load based on the third current. When the switching circuit operates in a second state, the first current passes through the load, and the second load voltage is generated across the load based on the first current. When the switching circuit operates in a third state, the second current passes through the sensing element, and the sensing element outputs the second CTAT voltage and the fourth current based on the second current. Further, the fourth current passes through the load, and the third load voltage is generated across the load based on the fourth current. When the switching circuit operates in a fourth state, the second current passes through the load, and the fourth load voltage is generated across the load based on the second current.

In some embodiments, the sensing element may correspond to a bipolar transistor. The bipolar transistor may be configured to output, based on the first current, a first base voltage, a first emitter voltage, and the third current. The bipolar transistor may be further configured to output, based on the second current, a second base voltage, a second emitter voltage, and the fourth current. A difference between the first base voltage and the first emitter voltage corresponds to the first CTAT voltage, and a difference between the second base voltage and the second emitter voltage corresponds to the second CTAT voltage. Further, the third current and the fourth current correspond to a first base current and a second base current of the transistor that are outputted based on the first current and the second current, respectively.

In some embodiments, the temperature sensor may further include an analog-to-digital converter (ADC) that may be coupled to the sensing element and the load. When the switching circuit operates in the first state, the ADC may be configured to receive the first base voltage, the first emitter voltage, and the first load voltage. Further, the ADC may be configured to output a first digital signal, a second digital signal, and a third digital signal that are indicative of voltage levels of the first base voltage, the first emitter voltage, and the first load voltage, respectively. When the switching circuit operates in the second state, the ADC may be further configured to receive the second load voltage and output a fourth digital signal that is indicative of a voltage level of the second load voltage. Further, when the switching circuit operates in the third state, the ADC may be configured to receive the second base voltage, the second emitter voltage, and the third load voltage. The ADC may be further configured to output a fifth digital signal, a sixth digital signal, and a seventh digital signal that are indicative of voltage levels of the second base voltage, the second emitter voltage, and the third load voltage, respectively. When the switching circuit operates in the fourth state, the ADC may be further configured to receive the fourth load voltage and output an eighth digital signal that is indicative of a voltage level of the fourth load voltage.

In some embodiments, the temperature sensor may further include a processing circuit that may be coupled to the ADC. The processing circuit may be configured to determine the difference between the second and first CTAT voltages based on the first digital signal, the second digital signal, the fifth digital signal, and the sixth digital signal. The difference between the second and first CTAT voltages corresponds to a proportional-to-absolute-temperature (PTAT) voltage. The processing circuit may be further configured to determine the current density ratio based on the third digital signal, the fourth digital signal, the seventh digital signal, and the eighth digital signal. Further, the processing circuit may be configured to generate the temperature value based on the PTAT voltage and the current density ratio.

In some embodiments, the temperature sensor may further include a switching circuit that may be coupled to the sensing element and the load. The switching circuit may include a first switch, a second switch, a third switch, a fourth switch, and a fifth switch. The first switch may be coupled to the sensing element while the second switch may be coupled to the load. Further, the third switch may be coupled to the second switch. The fourth switch may be coupled to the first switch, the second switch, and the third switch. Further, the first current is one of a group consisting of sourced to and sunk from the third switch, and a scaled version of the first current is one of a group consisting of sourced to and sunk from the fourth switch. The fifth switch may be coupled between the sensing element and the load.

In some embodiments, when the first switch, the third switch, and the fifth switch are activated and the second and fourth switches are deactivated, the switching circuit operates in the first state and the first current passes through the sensing element such that the sensing element outputs the first CTAT voltage and the third current. Further, the third current passes through the load such that the first load voltage is generated across the load. When the second and third switches are activated and the first switch, the fourth switch, and the fifth switch are deactivated, the switching circuit operates in the second state and the first current passes through the load such that the second load voltage is generated across the load.

In some embodiments, when the first switch, the third switch, the fourth switch, and the fifth switch are activated and the second switch is deactivated, the switching circuit operates in the third state and the second current passes through the sensing element such that the sensing element outputs the second CTAT voltage and the fourth current. Further, the fourth current passes through the load such that the third load voltage is generated across the load. When the second through fourth switches are activated and the first and fifth switches are deactivated, the switching circuit operates in the fourth state and the second current passes through the load such that the fourth load voltage is generated across the load.

In some embodiments, the temperature sensor may further include an enabling circuit that may be coupled to the first through fifth switches. The enabling circuit may be configured to generate a first enable signal to activate and deactivate the first switch and the fifth switch. Similarly, the enabling circuit may be configured to generate a second enable signal, a third enable signal, and a fourth enable signal to activate and deactivate the second switch, the third switch, and the fourth switch, respectively.

In some embodiments, the current density ratio is a ratio of a difference between the fourth and third load voltages and a difference between the second and first load voltages.

In some embodiments, the first current and the second current pass through the sensing element in a sequential manner.

In some embodiments, the second current is equal to a sum of the first current and a scaled version of the first current.

In some embodiments, the temperature sensor may further include a current source and a current control circuit that may be coupled to the current source. The current source may be configured to generate a fifth current. The current control circuit may be further configured to output the first current and the scaled version of the first current based on the fifth current. The first current is a mirrored version of the fifth current.

In some embodiments, the current control circuit may include a first transistor, a second transistor, and a third transistor. The first transistor has a first terminal that may be configured to receive a supply voltage and second and third terminals that may be coupled to each other and the current source. The fifth current is one of a group consisting of sourced to and sunk from the third terminal of the first transistor. The second transistor has a first terminal that may be configured to receive the supply voltage, a second terminal that may be coupled to the second terminal of the first transistor, and a third terminal that may be configured to output the first current. The third transistor has a first terminal that may be configured to receive the supply voltage, a second terminal that may be coupled to the second terminal of the first transistor, and a third terminal that may be configured to output the scaled version of the first current.

In some embodiments, the temperature sensor may further include a biasing circuit that may be coupled to the sensing element. The biasing circuit may be configured to output a bias voltage and provide the bias voltage to the sensing element to control an operation of the sensing element. A voltage level of the bias voltage may be such that the sensing element is operational.

In some embodiments, the biasing circuit may include a transistor and an amplifier. The transistor has a first terminal, a second terminal, and a third terminal. The first terminal of the transistor may be coupled to the load and the third terminal of the transistor may be coupled to the sensing element. The amplifier has a first input terminal that may be coupled to the third terminal of the transistor, a second input terminal that may be configured to receive the bias voltage, and an output terminal that may be coupled to the second terminal of the transistor. The transistor and the amplifier, coupled in a feedback configuration, may be configured to output the bias voltage at the third terminal of the transistor.

In some embodiments, the temperature sensor may further include a voltage generator that may be coupled to the second input terminal of the amplifier. The voltage generator may be configured to generate the bias voltage and provide the bias voltage to the second input terminal of the amplifier.

Conventionally, temperature sensors include two identical bipolar transistors through which two different currents are passed to generate a proportional-to-absolute-temperature (PTAT) voltage. A temperature value indicative of a temperature sensed by a temperature sensor is typically determined based on the PTAT voltage and a current density ratio of the temperature sensor. The current density ratio is a constant value. The accuracy of the temperature sensor depends on a current source that generates various currents that are passed through the bipolar transistors as well as parameter matching between the two bipolar transistors. When the current source is faulty or there is a mismatch between the two bipolar transistors, the current density ratio changes. As the constant value of the current density ratio is utilized for determining the temperature value, a faulty current source or a mismatch between the two bipolar transistors degrades the accuracy of the temperature sensor. To minimize the effect of the faulty current source and the mismatch between the two bipolar transistors, conventional temperature sensors utilize the dynamic element matching (DEM) technique. In the DEM technique, different pairs of currents are passed through the two bipolar transistors and then the results (e.g., various PTAT voltages) are averaged out to obtain a final temperature value. However, the current density ratio remains fixed in such cases. The fixed current density ratio ensures that inaccuracy persists in the temperature sensing operation of such temperature sensors.

Various embodiments of the present disclosure disclose a temperature sensor. The temperature sensor includes a load and a bipolar transistor that acts as a sensing element. Two different currents are passed through the bipolar transistor. When a first current is passed through the bipolar transistor, the bipolar transistor outputs a first complementary-to-absolute-temperature (CTAT) voltage (e.g., a first base-emitter voltage) and a second current (e.g., a first base current). In such a scenario, the first base current is passed through the load and results in the generation of a first load voltage across the load. The first current is then directly passed through the load and results in the generation of a second load voltage across the load. The difference between the second and first load voltages is indicative of a collector current of the bipolar transistor when the first current passes through the bipolar transistor. Similarly, when a third current is passed through the bipolar transistor, the bipolar transistor outputs a second CTAT voltage (e.g., a second base-emitter voltage) and a fourth current (e.g., a second base current). In such a scenario, the second base current is passed through the load and results in the generation of a third load voltage across the load. The third current is then directly passed through the load and results in the generation of a fourth load voltage across the load. The difference between the fourth and third load voltages is indicative of a collector current of the bipolar transistor when the second current passes through the bipolar transistor.

A current density ratio of the temperature sensor is determined based on the first through fourth load voltages. For example, the current density ratio is a ratio of the difference between the fourth and third load voltages and the difference between the second and first load voltages (i.e., a ratio of two collector currents). Further, a difference between the second and first CTAT voltages corresponds to a PTAT voltage. Based on the current density ratio and the PTAT voltage, a temperature value indicative of the temperature sensed by the temperature sensor is generated. The temperature value may be compared with a threshold limit, and when the temperature value is greater than or equal to the threshold limit, an IC including the temperature sensor may be shut down. As a result, the IC is prevented from being damaged.

In the temperature sensor of the present disclosure, a single bipolar transistor is utilized for determining the PTAT voltage, thereby eliminating errors caused by the mismatch between two identical bipolar transistors. Further, the current density ratio and the PTAT voltage are determined in real-time. As a result, any variations in a current source or any variations introduced by the bipolar transistor when two different currents pass therethrough are compensated by the current density ratio that is determined in real-time. Hence, the accuracy of the temperature sensor of the present disclosure is significantly greater than that of conventional temperature sensors.

FIG. 1 illustrates a schematic block diagram of an integrated circuit (IC) 100 in accordance with an embodiment of the present disclosure. The IC 100 may include a power supply 102, a temperature sensor 104, and a controller 106. The IC 100 may be utilized in automotive devices, networking devices, mobile devices, medical devices, or the like.

The power supply 102 may be configured to generate a first supply voltage VDD and a second supply voltage VSS. The second supply voltage VSS is less than the first supply voltage VDD. Further, the second supply voltage VSS may be equal to a ground voltage (e.g., 0 volts). However, in other embodiments, the second supply voltage VSS may be at other values, such as at less than the ground voltage (e.g., −1 volt) or greater than the ground voltage (e.g., 1 volt).

The temperature sensor 104 may be coupled to the power supply 102. The temperature sensor 104 may be configured to receive the first and second supply voltages VDD and VSS from the power supply 102. The first and second supply voltages VDD and VSS control an operation of the temperature sensor 104. In other words, for the temperature sensor 104 to operate in an accurate manner, a difference between the first and second supply voltages VDD and VSS is required to be greater than a predefined limit. The temperature sensor 104 may be further configured to sense a temperature of the IC 100 or a portion of the IC 100 that is in the vicinity of the temperature sensor 104 and generate a temperature value TEM indicative of the sensed temperature. The temperature value TEM is a digital representation of the sensed temperature.

The temperature sensor 104 includes a sensing element and a load (shown later in FIGS. 2 and 3). Multiple different currents pass through the sensing element in a sequential manner. Based on each current that passes through the sensing element, the sensing element outputs a complementary-to-absolute-temperature (CTAT) voltage and another current. Further, the currents that pass through the sensing element and the currents that the sensing element output separately pass through the load and result in the generation of various load voltages across the load. A current density ratio of the temperature sensor 104 is determined based on the load voltages generated across the load. Further, the temperature value TEM is generated based on the current density ratio and the CTAT voltages outputted by the sensing element. The temperature sensor 104 is explained in detail in conjunction with FIGS. 2, 3, 4A, and 4B.

The controller 106 may be coupled to the temperature sensor 104. The controller 106 may include suitable circuitry that may be configured to perform one or more operations. For example, the controller 106 may be configured to receive the temperature value TEM from the temperature sensor 104. The controller 106 may be further configured to compare the temperature value TEM with a threshold limit and determine whether the temperature value TEM is greater than or equal to the threshold limit. The threshold limit may correspond to a maximum tolerable temperature of the IC 100. When the temperature value TEM is greater than or equal to the threshold limit, the controller 106 may be further configured to deactivate (e.g., shut down) the IC 100.

The scope of the present disclosure is not limited to the temperature value TEM being utilized for shutting down the IC 100 when the temperature of the IC 100 is greater than or equal to the threshold limit. In various other embodiments, the temperature value TEM may be utilized by the controller 106 for performing various other operations (e.g., trimming another temperature sensor included on the IC 100, reducing the power consumed by the IC 100, or the like), without deviating from the scope of the present disclosure.

Although FIG. 1 illustrates that all the circuits are implemented on IC 100, the scope of the present disclosure is not limited to it. In various other embodiments, some of the circuits may be external to the IC 100, without deviating from the scope of the present disclosure. For example, in some embodiments, the power supply 102 may be external to the IC 100.

Figure 2:
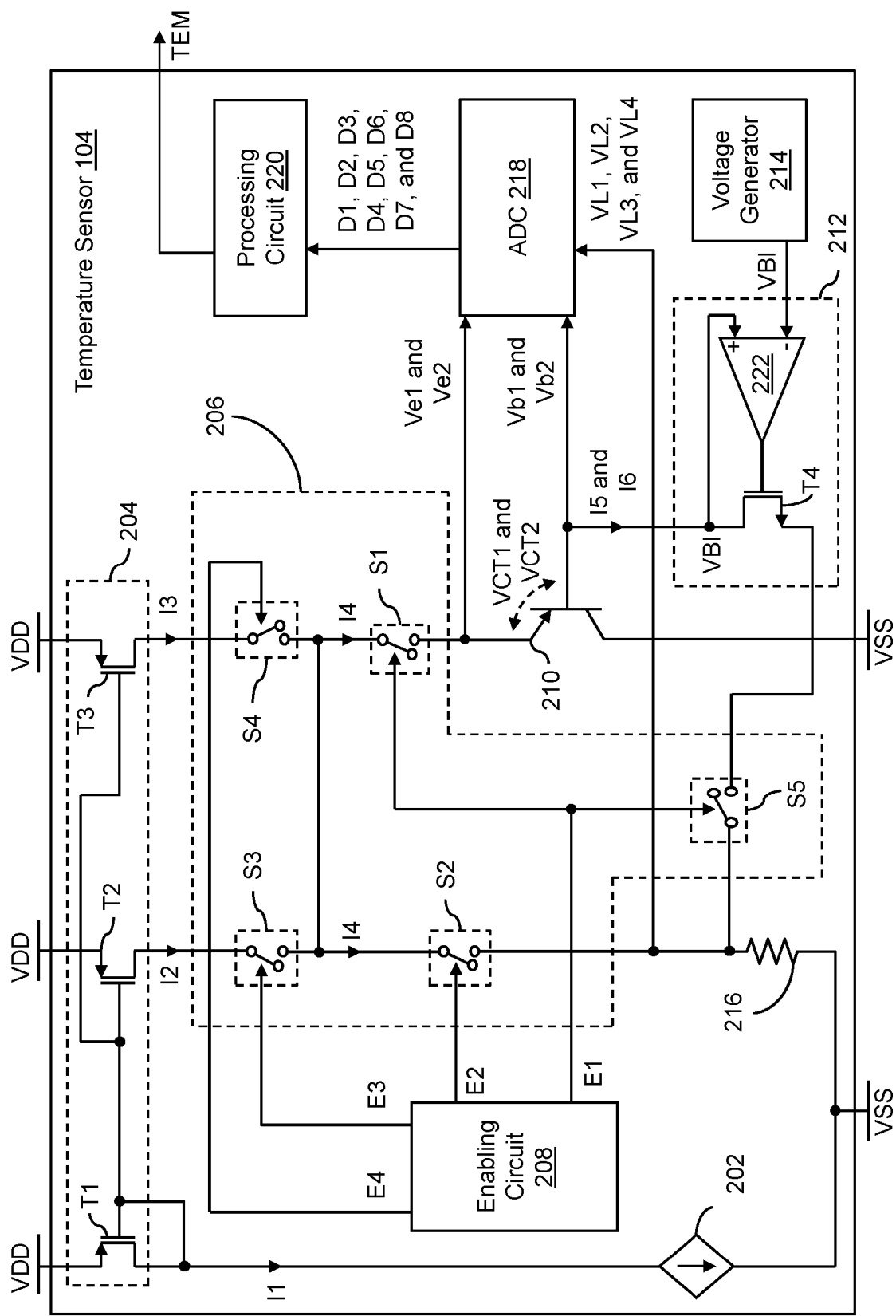
FIG. 2 illustrates a schematic circuit diagram of a temperature sensor of the IC of FIG. 1 in accordance with an embodiment of the present disclosure.

FIG. 2 illustrates a schematic circuit diagram of the temperature sensor 104 in accordance with an embodiment of the present disclosure. The temperature sensor 104 corresponds to a semiconductor-based temperature sensor. The temperature sensor 104 may include a current source 202, a current control circuit 204, a switching circuit 206, an enabling circuit 208, the sensing element (hereinafter referred to as the "sensing element 210"), a biasing circuit 212, a voltage generator 214, the load (hereinafter referred to as the "load 216"), an analog-to-digital converter (ADC) 218, and a processing circuit 220.

The following table illustrates various signals described in FIG. 2:

| Signal | Description |
|---|---|
| First current I1 | Current required for the temperature sensor 104 to operate |
| Second current I2 | Mirrored version of the first current I1 |
| Third current I3 | Scaled version of the first current I1 or the second current I2 |
| Fourth current I4 | Sum of the second and third currents I2 and I3 |
| Fifth current I5 | Base current outputted by the sensing element 210 (e.g., a bipolar transistor) when the second current I2 passes through the sensing element 210 |
| First base voltage Vb1 and first emitter voltage Ve1 | Base and emitter voltages outputted by the sensing element 210, respectively, when the second current I2 passes through the sensing element 210 |
| First CTAT voltage VCT1 | Equal to a difference between the first base voltage Vb1 and the first emitter voltage Ve1 |
| Sixth current I6 | Base current outputted by the sensing element 210 when the fourth current I4 passes through the sensing element 210 |
| Second base voltage Vb2 and second emitter voltage Ve2 | Base and emitter voltages outputted by the sensing element 210, respectively, when the fourth current I4 passes through the sensing element 210 |
| Second CTAT voltage VCT2 | Equal to a difference between the second base voltage Vb2 and the second emitter voltage Ve2 |
| First through fourth load voltages VL1-VL4 | Voltages generated across the load 216 when the fifth, second, sixth, and fourth currents I5, I2, I6, and I4 pass through the load 216, respectively |
| First through eighth digital signals D1-D8 | Digital representation of voltage levels of the first base voltage Vb1, the first emitter voltage Ve1, the first load voltage VL1, the second load voltage VL2, the second base voltage Vb2, the second emitter voltage Ve2, the third load voltage VL3, and the fourth load voltage VL4, respectively |
| Bias voltage VBI | Maintains the sensing element 210 in an activated state |
| First through fourth enable signals E1-E4 | Enable various switches of the switching circuit 206 |

The current source 202 may be coupled to the current control circuit 204 and the power supply 102. The current source 202 may be configured to receive the second supply voltage VSS from the power supply 102. Based on the second supply voltage VSS, the current source 202 may be configured to generate a first current I1 such that the first current I1 is sunk from the current control circuit 204. The first current I1 corresponds to an input current required for the temperature sensor 104 to operate (e.g., perform the temperature sensing operation).

The current control circuit 204 may be coupled to the power supply 102 and the current source 202. The current control circuit 204 may be configured to receive the first supply voltage VDD from the power supply 102. Further, the first current I1 generated by the current source 202 is sunk from the current control circuit 204. Based on the first supply voltage VDD and the first current I1, the current control circuit 204 may be further configured to output a second current I2 and a third current I3. The second current I2 is a mirrored version of the first current I1. Further, the third current I3 is a scaled version of the first current I1. In other words, the third current I3 is a scaled version of the second current I2. In an example, the third current I3 is greater than the second current I2.

The current control circuit 204 may include a first transistor T1, a second transistor T2, and a third transistor T3. Each of the first through third transistors T1-T3 has a first terminal, a second terminal, and a third terminal. The first terminals of the first through third transistors T1-T3 may be coupled to the power supply 102. The first terminals of the first through third transistors T1-T3 may be configured to receive the first supply voltage VDD from the power supply 102. The second and third terminals of the first transistor T1 may be coupled to each other and further coupled to the current source 202 such that the first current I1 is sunk from the second and third terminals of the first transistor T1. The second terminals of the second and third transistors T2 and T3 may be coupled to the second terminal of the first transistor T1. Further, the third terminals of the second and third transistors T2 and T3 may be configured to output the second and third currents I2 and I3, respectively.

The current control circuit 204 thus outputs the second and third currents I2 and I3 based on the first current I1. In an embodiment, each of the first through third transistors T1-T3 is a p-channel metal-oxide-semiconductor (PMOS) transistor, the first through third terminals of each of the first through third transistors T1-T3 correspond to source, gate, and drain terminals, respectively. Thus, the first and second transistors T1 and T2 may correspond to a current mirror circuit that outputs the second current I2 as the mirrored version of the first current I1. Further, the second and third transistors T2 and T3 may correspond to a current replica circuit that outputs the third current I3 as the scaled version of the second current I2. The third current I3 may be "k" times the first current I1, where "k" is a scaling factor. In an example, the scaling factor "k" is greater than one.

The switching circuit 206 may be coupled to the current control circuit 204, the sensing element 210, and the load 216. The switching circuit 206 may receive the second and third currents I2 and I3 from the current control circuit 204 (e.g., the third terminals of the second and third transistors T2 and T3, respectively). Further, the switching circuit 206 may sequentially operate in a first state, a second state, a third state, and a fourth state. When the switching circuit 206 operates in the first and second states, the switching circuit 206 may be configured to source the second current I2 to the sensing element 210 and the load 216, respectively. Similarly, when the switching circuit 206 operates in the third and fourth states, the switching circuit 206 may be configured to source a fourth current I4 to the sensing element 210 and the load 216, respectively. The fourth current I4 is different from the second current I2. For example, the fourth current I4 is equal to a sum of the second current I2 and the third current I3 (e.g., the scaled version of the second current I2). Internals of the switching circuit 206:

The switching circuit 206 may include a first switch S1, a second switch S2, a third switch S3, a fourth switch S4, and a fifth switch S5. Each of the first through fifth switches S1-S5 has first and second data terminals and a control terminal. An operation of each of the first through fifth switches S1-S5 is controlled by way of the corresponding control terminal.

The first data terminal of the first switch S1 may be coupled to the sensing element 210, and the first data terminal of the second switch S2 may be coupled to the load 216. Further, the first data terminal of the third switch S3 may be coupled to the third terminal of the second transistor T2, and the first data terminal of the fourth switch S4 may be coupled to the third terminal of the third transistor T3. Thus, the second and third currents I2 and I3 are sourced to the first data terminals of the third and fourth switches S3 and S4, respectively. The second data terminals of the first through fourth switches S1-S4 may be coupled to each other.

The control terminals of the first through fourth switches S1-S4 may be configured to receive a first enable signal E1, a second enable signal E2, a third enable signal E3, and a fourth enable signal E4, respectively. The operations of the first through fourth switches S1-S4 are controlled based on the first through fourth enable signals E1-E4, respectively. In an embodiment, the first through fourth switches S1-S4 are activated (e.g., are closed) when the first through fourth enable signals E1-E4 are asserted (e.g., are at a logic high state), respectively. Further, the first through fourth switches S1-S4 are deactivated (e.g., are open) when the first through fourth enable signals E1-E4 are de-asserted (e.g., are at a logic low state), respectively. When the third and fourth switches S3 and S4 are activated, the second data terminals of the first and second switches S1 and S2 receive the fourth current I4 that is greater than the second current I2.

The first data terminal of the fifth switch S5 may be coupled to the load 216 and the second data terminal of the fifth switch S5 may be coupled to the sensing element 210 by way of the biasing circuit 212. The fifth switch S5 is thus coupled between the sensing element 210 and the load 216. Further, the control terminal of the fifth switch S5 may be configured to receive the first enable signal E1. The operation of the fifth switch S5 is controlled based on the first enable signal E1. In an embodiment, the fifth switch S5 is activated (e.g., is closed) when the first enable signal E1 is asserted (e.g., is at a logic high state). Further, the fifth switch S5 is deactivated (e.g., is open) when the first enable signal E1 is de-asserted (e.g., is at a logic low state).

Various States of the Switching Circuit 206:

The switching circuit 206 operates in the first state when the first switch S1, the third switch S3, and the fifth switch S5 are activated and the second and fourth switches S2 and S4 are deactivated. In such a scenario, the second current I2 passes through the sensing element 210 (e.g., is sourced to the sensing element 210 by way of the third and first switches S3 and S1). Based on the second current I2, a fifth current I5 and a first CTAT voltage VCT1 are outputted by the sensing element 210. Further, the fifth current I5 passes through the load 216 (e.g., is sourced to the load 216 by way of the biasing circuit 212 and the fifth switch S5). Based on the fifth current I5, a first load voltage VL1 is generated across the load 216.

The switching circuit 206 operates in the second state when the second and third switches S2 and S3 are activated and the first switch S1, the fourth switch S4, and the fifth switch S5 are deactivated. In such a scenario, the second current I2 passes through the load 216 (e.g., is sourced to the load by way of the third and second switches S3 and S2). Based on the second current I2, a second load voltage VL2 is generated across the load 216.

The switching circuit 206 operates in the third state when the first switch S1, the third switch S3, the fourth switch S4, and the fifth switch S5 are activated and the second switch S2 is deactivated. In such a scenario, the fourth current I4 passes through the sensing element 210 (e.g., is sourced to the sensing element 210 by way of the third switch S3, the fourth switch S4, and the first switch S1). Based on the fourth current I4, a sixth current I6 and a second CTAT voltage VCT2 are outputted by the sensing element 210. Further, the sixth current I6 passes through the load 216 (e.g., is sourced to the load 216 by way of the biasing circuit 212 and the fifth switch S5). Based on the sixth current I6, a third load voltage VL3 is generated across the load 216.

The switching circuit 206 operates in the fourth state when the second through fourth switches S2-S4 are activated and the first and fifth switches S1 and S5 are deactivated. In such a scenario, the fourth current I4 passes through the load 216 (e.g., is sourced to the load 216 by way of the third switch S3, the fourth switch S4, and the second switch S2). Based on the fourth current I4, a fourth load voltage VL4 is generated across the load 216. The temperature value TEM is generated based on the first and second CTAT voltages VCT1 and VCT2 and the first through fourth load voltages VL1-VL4.

The second and fourth currents I2 and I4 may be collectively referred to as a "first plurality of currents I2 and I4", and the fifth and sixth currents I5 and I6 may be collectively referred to as a "second plurality of currents I5 and I6". Further, the first and second CTAT voltages VCT1 and VCT2 may be collectively referred to as a "plurality of CTAT voltages VCT1 and VCT2", and the first through fourth load voltages VL1-VL4 may be collectively referred to as a "plurality of load voltages VL1-VL4". Additionally, the first through fourth states may be collectively referred to as a "plurality of states".

The enabling circuit 208 may be coupled to the switching circuit 206 (e.g., the control terminals of the first through fifth switches S1-S5). The enabling circuit 208 may include suitable circuitry that may be configured to perform one or more operations. For example, the enabling circuit 208 may be configured to generate the first enable signal E1 to activate and deactivate the first and fifth switches S1 and S5. Further, the enabling circuit 208 may be configured to provide the first enable signal E1 to the control terminals of first and fifth switches S1 and S5. Similarly, the enabling circuit 208 may be configured to generate the second through fourth enable signals E2-E4 to activate and deactivate the second through fourth switches S2-S4, respectively. Further, the enabling circuit 208 may be configured to provide the second through fourth enable signals E2-E4 to the control terminals of the second through fourth switches S2-S4, respectively.

The sensing element 210 may be coupled to the power supply 102, the switching circuit 206, and the biasing circuit 212. Further, the sensing element 210 may be coupled to the load 216 by way of the biasing circuit 212. The sensing element 210 may be configured to receive the second supply voltage VSS from the power supply 102. Further, the sensing element 210 may be configured to receive a bias voltage VBI from the biasing circuit 212. The sensing element 210 is controlled based on the bias voltage VBI. In other words, a voltage level of the bias voltage VBI is such that the sensing element 210 is operational. The sensing element 210 may be further configured to receive the second current I2 and the fourth current I4 from the switching circuit 206. In other words, the second and fourth currents I2 and I4 pass through the sensing element 210. Further, the second and fourth currents I2 and I4 pass through the sensing element 210 in a sequential manner (e.g., a non-simultaneous manner).

When the second current I2 passes through the sensing element 210, the sensing element 210 may be further configured to output the first CTAT voltage VCT1 and the fifth current I5 based on the second current I2. The second current I2 passes through the sensing element 210 when the switching circuit 206 operates in the first state. Further, the sensing element 210 may be configured to source the fifth current I5 to the load 216 by way of the biasing circuit 212 and the fifth switch S5. In other words, the fifth current I5 passes through the load 216. Based on the fifth current I5, the first load voltage VL1 is generated across the load 216.

When the fourth current I4 passes through the sensing element 210, the sensing element 210 may be further configured to output the second CTAT voltage VCT2 and the sixth current I6 based on the fourth current I4. The fourth current I4 passes through the sensing element 210 when the switching circuit 206 operates in the third state. Further, the sensing element 210 may be configured to source the sixth current I6 to the load 216 by way of the biasing circuit 212 and the fifth switch S5. In other words, the sixth current I6 passes through the load 216. Based on the sixth current I6, the third load voltage VL3 is generated across the load 216.

One Implementation of the Sensing Element 210:

As illustrated in FIG. 2, the sensing element 210 may correspond to a PNP transistor (i.e., a bipolar transistor). In such a scenario, a collector terminal of the PNP transistor may be coupled to the power supply 102, and configured to receive the second supply voltage VSS. Further, a base terminal of the PNP transistor may be coupled to the biasing circuit 212 and an emitter terminal of the PNP transistor may be coupled to the switching circuit 206 (e.g., the first data terminal of the first switch S1).

When the second current I2 is received at the emitter terminal of the PNP transistor, the PNP transistor may be configured to output a first base voltage Vb1 and a first emitter voltage Ve1 at the base and emitter terminals thereof, respectively. A difference between the first base voltage Vb1 and the first emitter voltage Ve1 corresponds to the first CTAT voltage VCT1. Thus, the first CTAT voltage VCT1 is a first base-emitter voltage of the PNP transistor (e.g., a base-emitter voltage of the PNP transistor when the second current I2 passes through the PNP transistor). Further, based on the second current I2, the PNP transistor may be configured to output the fifth current I5 at the base terminal thereof. The fifth current I5 thus corresponds to a first base current of the PNP transistor (e.g., a base current of the PNP transistor when the second current I2 passes through the PNP transistor). The PNP transistor may additionally output a first collector current (not shown) at the collector terminal thereof.

When the fourth current I4 is received at the emitter terminal of the PNP transistor, the PNP transistor may be configured to output a second base voltage Vb2 and a second emitter voltage Ve2 at the base and emitter terminals thereof, respectively. A difference between the second base voltage Vb2 and the second emitter voltage Ve2 corresponds to the second CTAT voltage VCT2. Thus, the second CTAT voltage VCT2 is a second base-emitter voltage of the PNP transistor (e.g., a base-emitter voltage of the PNP transistor when the fourth current I4 passes through the PNP transistor). Further, based on the fourth current I4, the PNP transistor may be configured to output the sixth current I6 at the base terminal thereof. Thus, the sixth current I6 corresponds to a second base current of the PNP transistor (e.g., a base current of the PNP transistor when the fourth current I4 passes through the PNP transistor). The PNP transistor may additionally output a second collector current (not shown) at the collector terminal thereof.

The biasing circuit 212 may be coupled to the sensing element 210 (e.g., the base terminal of the PNP transistor) and the load 216. The biasing circuit 212 may be configured to output the bias voltage VBI and provide the bias voltage VBI to the sensing element 210 to control the operation of the sensing element 210. The voltage level of the bias voltage VBI is such that the sensing element 210 is operational. The biasing circuit 212 further enables passage of the fifth and sixth currents I5 and I6 from the sensing element 210 to the load 216. The biasing circuit 212 may include a fourth transistor T4 and an amplifier 222.

The fourth transistor T4 has a first terminal, a second terminal, and a third terminal. The first terminal of the fourth transistor T4 may be coupled to the load 216 by way of the fifth switch S5, and the third terminal of the fourth transistor T4 may be coupled to the sensing element 210 (e.g., the base terminal of the PNP transistor). In an embodiment, the fourth transistor T4 is an n-channel metal-oxide-semiconductor (NMOS) transistor and the first through third terminals of the fourth transistor T4 correspond to source, gate, and drain terminals, respectively.

The amplifier 222 has a first input terminal that may be coupled to the third terminal of the fourth transistor T4 and a second input terminal that may be configured to receive the bias voltage VBI. The first and second input terminals may correspond to positive and negative input terminals of the amplifier 222, respectively. The amplifier 222 further has an output terminal that may be coupled to the second terminal of the fourth transistor T4.

The fourth transistor T4 and the amplifier 222 are thus coupled in a feedback configuration. In such a scenario, the fourth transistor T4 and the amplifier 222 may be configured to output the bias voltage VBI at the third terminal of the fourth transistor T4. The bias voltage VBI received at the second input terminal (e.g., the negative input terminal) of the amplifier 222 is thus provided to the base terminal of the PNP transistor.

The voltage generator 214 may be coupled to the second input terminal of the amplifier 222. The voltage generator 214 may be configured to generate the bias voltage VBI and provide the bias voltage VBI to the second input terminal of the amplifier 222. In an example, the bias voltage VBI is equal to 300 millivolts. However, the bias voltage VBI may have other values in other embodiments.

The load 216 may be coupled to the sensing element 210 (e.g., the base terminal of the PNP transistor) by way of the fifth switch S5 and the biasing circuit 212. Further, the load 216 may be coupled to the switching circuit 206 (e.g., the first data terminal of the second switch S2). Additionally, the load 216 may be coupled to the power supply 102, and configured to receive the second supply voltage VSS. One implementation of the load 216:

As illustrated in FIG. 2, the load 216 corresponds to a resistor. The resistor has a first terminal that may be coupled to the sensing element 210 (e.g., the base terminal of the PNP transistor) by way of the biasing circuit 212 and the fifth switch S5. The first terminal of the resistor may be further coupled to the switching circuit 206 (e.g., the first data terminal of the second switch S2). The resistor further has a second terminal that may be coupled to the power supply 102, and configured to receive the second supply voltage VSS. Further, the load 216 has the second current I2, the fourth current I4, the fifth current I5, and the sixth current I6 pass therethrough.

When the switching circuit 206 operates in the first state, the fifth current I5 outputted by the sensing element 210 passes through the load 216 (e.g., is sourced to the load 216). Based on the fifth current I5, the first load voltage VL1 is generated across the load 216. The first load voltage VL1 corresponds to the voltage drop across the load 216 when the fifth current I5 passes through the load 216. Similarly, when switching circuit 206 operates in the second state, the second current I2 passes through the load 216 (e.g., is sourced to the load 216). Based on the second current I2, the second load voltage VL2 is generated across the load 216. Further, when the switching circuit 206 operates in the third state, the sixth current I6 outputted by the sensing element 210 passes through the load 216 (e.g., is sourced to the load 216). Based on the sixth current I6, the third load voltage VL3 is generated across the load 216. Similarly, when switching circuit 206 operates in the fourth state, the fourth current I4 passes through the load 216 (e.g., is sourced to the load 216). Based on the fourth current I4, the fourth load voltage VL4 is generated across the load 216.

The ADC 218 may be coupled to the sensing element 210 (e.g., the emitter and base terminals of the PNP transistor) and the load 216 (e.g., the first terminal of the resistor). The ADC 218 may include suitable circuitry that may be configured to perform one or more operations. For example, the ADC 218 may be configured to receive, when the switching circuit 206 operates in the first state, the first base voltage Vb1, the first emitter voltage Ve1, and the first load voltage VL1 from the base and emitter terminals of the PNP transistor (e.g., the sensing element 210) and the first terminal of the resistor (e.g., the load 216), respectively. In other words, the ADC 218 measures the voltages at the base and emitter terminals of the PNP transistor and the first terminal of the resistor. Further, the ADC 218 may be configured to output a first digital signal D1, a second digital signal D2, and a third digital signal D3 that are indicative of (e.g., are digital representations of) voltage levels of the first base voltage Vb1, the first emitter voltage Ve1, and the first load voltage VL1, respectively.

When the switching circuit 206 operates in the second state, the ADC 218 may be further configured to receive the second load voltage VL2 from the first terminal of the resistor (e.g., the load 216). In other words, the ADC 218 measures the voltage at the first terminal of the resistor. Further, the ADC 218 may be configured to output a fourth digital signal D4 that is indicative of (e.g., is a digital representation of) a voltage level of the second load voltage VL2.

When the switching circuit 206 operates in the third state, the ADC 218 may be configured to receive the second base voltage Vb2, the second emitter voltage Ve2, and the third load voltage VL3 from the base and emitter terminals of the PNP transistor (e.g., the sensing element 210) and the first terminal of the resistor (e.g., the load 216), respectively. In other words, the ADC 218 measures the voltages at the base and emitter terminals of the PNP transistor and the first terminal of the resistor. Further, the ADC 218 may be configured to output a fifth digital signal D5, a sixth digital signal D6, and a seventh digital signal D7 that are indicative of (e.g., are digital representations of) voltage levels of the second base voltage Vb2, the second emitter voltage Ve2, and the third load voltage VL3, respectively.

When the switching circuit 206 operates in the fourth state, the ADC 218 may be further configured to receive the fourth load voltage VL4 from the first terminal of the resistor (e.g., the load 216). In other words, the ADC 218 measures the voltage at the first terminal of the resistor. Further, the ADC 218 may be configured to output an eighth digital signal D8 that is indicative of (e.g., is a digital representation of) a voltage level of the fourth load voltage VL4.

The processing circuit 220 may be coupled to the ADC 218. The processing circuit 220 may include suitable circuitry that may be configured to perform one or more operations. For example, the processing circuit 220 may be configured to receive the first through eighth digital signals D1-D8 from the ADC 218. The first through third digital signals D1-D3 may be received when the switching circuit 206 operates in the first state and the fourth digital signal D4 may be received when the switching circuit 206 operates in the second state. Further, the fifth through seventh digital signals D5-D7 may be received when the switching circuit 206 operates in the third state and the eighth digital signal D8 may be received when the switching circuit 206 operates in the fourth state.

The processing circuit 220 may be further configured to determine a difference between the second and first CTAT voltages VCT2 and VCT1. The difference between the second and first CTAT voltages VCT2 and VCT1 corresponds to a proportional-to-absolute-temperature (PTAT) voltage. Further, the first CTAT voltage VCT1 corresponds to the difference between the first base voltage Vb1 and the first emitter voltage Ve1, whereas the second CTAT voltage VCT2 corresponds to the difference between the second base voltage Vb2 and the second emitter voltage Ve2. Thus, the processing circuit 220 may be further configured to determine the first CTAT voltage VCT1 based on the first and second digital signals D1 and D2, and the second CTAT voltage VCT2 based on the fifth and sixth digital signals D5 and D6. In other words, the processing circuit 220 determines the PTAT voltage based on the first and second digital signals D1 and D2 and the fifth and sixth digital signals D5 and D6. The PTAT voltage is shown below in equation (1):

$$V_{PTAT} = VCT2 - VCT1 = \{(Vb2 - Ve2) - (Vb1 - Ve1)\} \quad (1)$$

where, $V_{PTAT}$ is the PTAT voltage.

The current density ratio of the temperature sensor 104 is a ratio of the collector currents of the PNP transistor (e.g., the sensing element 210) for two different emitter currents. The current density ratio of the temperature sensor 104 is shown below in equation (2):

$$N = \frac{Ic2}{Ic1} \quad (2)$$

where,

N is the current density ratio of the temperature sensor 104,

Ic1 is the collector current of the PNP transistor when the second current I2 is received at the emitter terminal of the PNP transistor, and Ic2 is the collector current of the PNP transistor when the fourth current I4 is received at the emitter terminal of the PNP transistor.

The collector current of a bipolar transistor is equal to a difference between the corresponding emitter and base currents. Thus, equation (2) may be rearranged to obtain equation (3) as shown below:

$$N = \frac{Ie2 - Ib2}{Ie1 - Ib1} \quad (3)$$

where,

Ie1 and Ib1 are emitter and base currents of the PNP transistor when the second current I2 is received at the emitter terminal of the PNP transistor, respectively, and Ie2 and Ib2 are emitter and base currents of the PNP transistor when the fourth current I4 is received at the emitter terminal of the PNP transistor, respectively.

The measurement of the above currents is facilitated through the load 216. The base current Ib1 corresponds to the fifth current I5 that passes through the load 216 and results in the generation of the first load voltage VL1 across the load 216. Similarly, the emitter current Ie1 corresponds to the second current I2 that passes through the load 216 and results in the generation of the second load voltage VL2 across the load 216. Further, the base current Ib2 corresponds to the sixth current I6 that passes through the load 216 and results in the generation of the third load voltage VL3 across the load 216. Similarly, the emitter current Ie2 corresponds to the fourth current I4 that passes through the load 216 and results in the generation of the fourth load voltage VL4 across the load 216. Thus, the current density ratio may be modified as shown below in equation (4):

$$N = \frac{VL4 - VL3}{VL2 - VL1} \quad (4)$$

The current density ratio is thus a ratio of the difference between the fourth and third load voltages VL4 and VL3 and the difference between the second and first load voltages VL2 and VL1. The third and fourth digital signals D3 and D4 received by the processing circuit 220 are indicative of the first and second load voltages VL1 and VL2, respectively. Similarly, the seventh and eighth digital signals D7 and D8 received by the processing circuit 220 are indicative of the third and fourth load voltages VL3 and VL4, respectively. Thus, the processing circuit 220 may be further configured to determine the current density ratio of the temperature sensor 104 based on the third and fourth digital signals D3 and D4 and the seventh and eighth digital signals D7 and D8 using the equation (4).

In an example, the scaling factor "k" is equal to "$N_d-1$", where $N_d$ is a predetermined value of the current density ratio. Hence, the third current I3 is equal to "$N_d-1$" times the second current I2. Consequently, the fourth current I4 is equal to "$N_d$" times the second current I2. The predetermined value of the current density ratio is thus utilized for determining the current density ratio of the temperature sensor 104 in real-time. The real-time determination of the current density ratio compensates for any variations in the beta (e.g., a ratio of collector and base currents) of the PNP transistor, thereby eliminating a need to implement various beta-compensation techniques. Further, "$N_d-1$" is utilized as the scaling factor "k" to obtain an accurate current (e.g., the third current I3) in an ideality curve of the PNP transistor and to limit errors in the temperature sensing operation.

The bipolar transistor current-voltage relation is shown below in equation (5):

$$Jc = Js \exp\left(\frac{Vbe}{n_f * V_T}\right) \quad (5)$$

where,

Jc is the current density of the bipolar transistor,

Js is the saturation current density of the bipolar transistor,

Vbe is the base-emitter voltage of the bipolar transistor, $n_f$ is the non-ideality factor, e.g., is equal to 1.008, and
$V_T$ is the thermal voltage that is represented as $\{(k*T)/q\}$, where k is the Boltzmann constant, q is the elementary charge, and T is the temperature.

Rearranging equation (5), equation (6) is obtained as shown below:

$$Vbe = \frac{n_f * k * T}{q} * \ln\left(\frac{Jc}{Js}\right) \quad (6)$$

When the same bipolar transistor is sequentially biased with different currents (e.g., two different current densities), two different base-emitter voltages may be generated. In such a scenario, the ratio of the two current densities may correspond to the current density ratio. Further, the difference between the two base-emitter voltages (e.g., the second and first CTAT voltages VCT2 and VCT1 in the present disclosure) corresponds to the PTAT voltage. Thus, the PTAT voltage may be determined as shown below in equation (7):

$$V_{PTAT} = \frac{n_f * k * T}{q} * \ln(N) \quad (7)$$

where,
N is equal to the ratio of two current densities (e.g., Jc2/Jc1), where Jc1 is the current density when the second current I2 passes through the bipolar transistor and Jc2 is the current density when the fourth current I4 (e.g., a current greater than the second current I2) passes through the bipolar transistor.

Rearranging the equation (7), the temperature value TEM of the temperature sensed by the temperature sensor 104 may be determined as shown below in equation (8):

$$TEM = \frac{V_{PTAT}}{\frac{(n_f * k)}{q} * \ln(N)} \quad (8)$$

The PTAT voltage is determined in equation (1) and the current density ratio is determined in equation (4). Further, $n_f$, k, and q have a constant value. Thus, the processing circuit 220 may be further configured to generate the temperature value TEM using equation (8). In other words, the processing circuit 220 may be further configured to generate the temperature value TEM based on the PTAT voltage and the current density ratio. The processing circuit 220 may be further configured to provide the temperature value TEM to the controller 106.

Variations in the Temperature Sensor 104 of FIG. 2:

In a first variation, the order of the states in which the switching circuit 206 operates may vary instead of the switching circuit 206 sequentially operating in the first through fourth states.

In a second variation, the current source 202 may be external to the temperature sensor 104 instead of being a part of the temperature sensor 104.

In a third variation, the load 216 may be implemented in a different manner instead of being a resistor.

In a fourth variation, the first and second CTAT voltages VCT1 and VCT2 (e.g., the first base-emitter voltage and the second base-emitter voltage) and the first through fourth load voltages VL1-VL4 may be measured by way of input/output pads on the IC 100 and the temperature value TEM may be generated based on the measured voltages instead of the combination of the ADC 218 and the processing circuit 220.

In a fifth variation, the ADC 218 and the processing circuit 220 may be external to the IC 100 instead of being included on the IC 100.

In a sixth variation, the fourth transistor T4 included in the biasing circuit 212 may be a PMOS transistor instead of an NMOS transistor. In such a scenario, the source terminal of the PMOS transistor may be coupled to the sensing element 210 (e.g., the base terminal of the PNP transistor) and the drain terminal of the PMOS transistor may be coupled to the load 216 by way of the fifth switch S5. Further, the bias voltage VBI from the voltage generator 214 may be received at the positive input terminal of the amplifier 222 and the negative input terminal of the amplifier 222 may be coupled to the source terminal of the PMOS transistor.

In a seventh variation, the third current I3 may be less than the second current I2 instead of being greater than the second current I2. In other words, the scaling factor "k" may be less than one instead of being greater than one.

Figure 3:
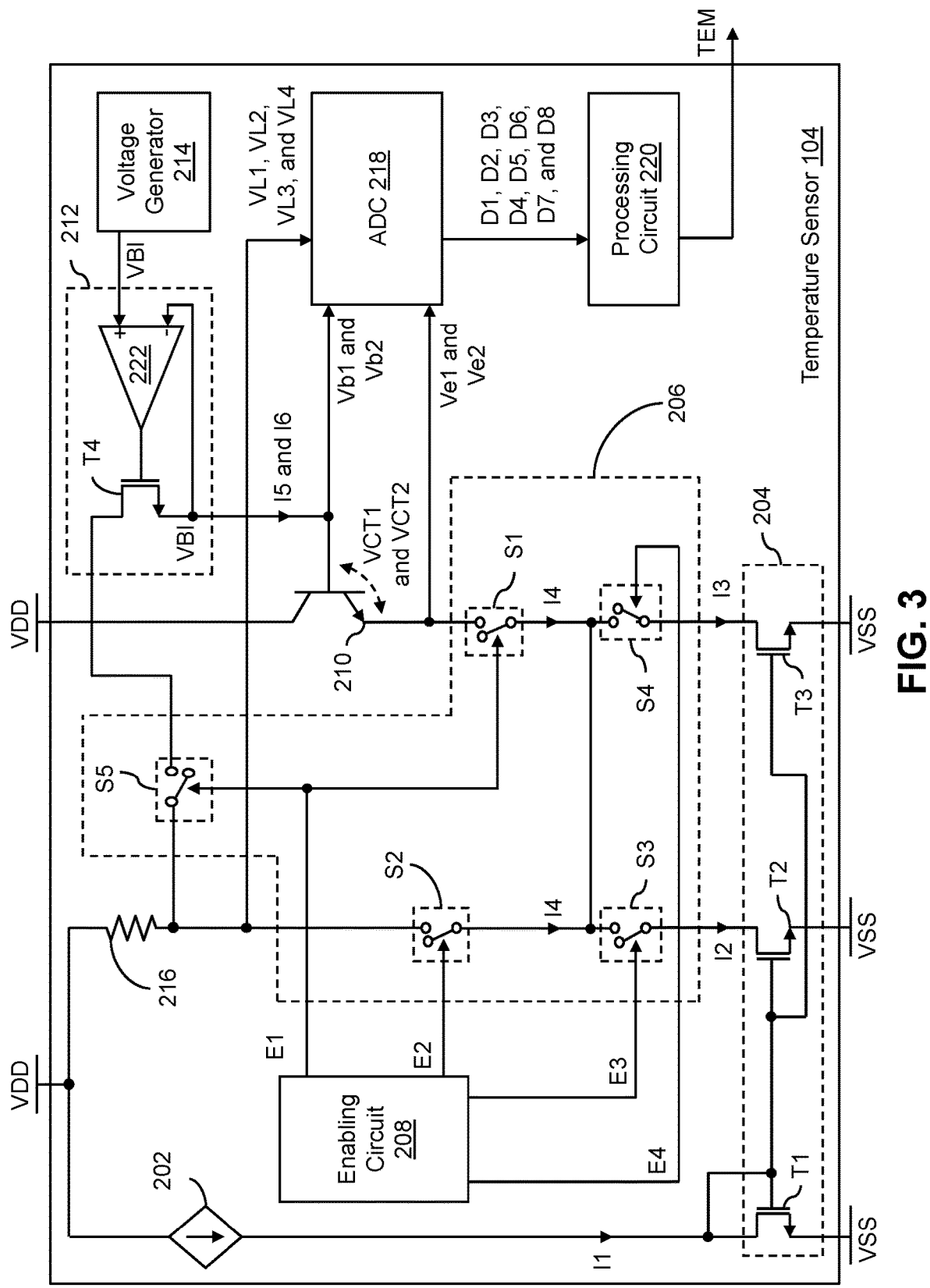
FIG. 3 illustrates a schematic circuit diagram of the temperature sensor of the IC of FIG. 1 in accordance with another embodiment of the present disclosure.

FIG. 3 illustrates a schematic circuit diagram of the temperature sensor 104 in accordance with another embodiment of the present disclosure. As illustrated in FIG. 3, the temperature sensor 104 may include the current source 202, the current control circuit 204, the switching circuit 206, the enabling circuit 208, the sensing element 210, the biasing circuit 212, the voltage generator 214, the load 216, the ADC 218, and the processing circuit 220.

The difference between the temperature sensor 104 of FIG. 3 and the temperature sensor 104 of FIG. 2 is that the sensing element 210 is an NPN transistor in the temperature sensor 104 of FIG. 3 as opposed to being a PNP transistor in the temperature sensor 104 of FIG. 2. Hence, the collector terminal of the NPN transistor receives the first supply voltage VDD instead of the second supply voltage VSS.

The change in the sensing element 210 results in changes in other components of the temperature sensor 104. For example, the first current I1 is sourced to the current control circuit 204 instead of being sunk from the current control circuit 204. Consequently, the second and third currents I2 and I3 outputted by the current control circuit 204 are sunk from the switching circuit 206 (e.g., the first data terminals of the third and fourth switches S3 and S4, respectively). In such a scenario, the first through third transistors T1-T3 of the current control circuit 204 corresponds to NMOS transistors having source terminals configured to receive the second supply voltage VSS instead of PMOS transistors having source terminals configured to receive the first supply voltage VDD. Further, the second and fourth currents I2 and I4 are sunk from the sensing element 210 instead of being sourced to the sensing element 210. The sensing element 210 outputs the first CTAT voltage VCT1 and the fifth current I5 based on the second current I2. Further, the sensing element 210 outputs and the second CTAT voltage VCT2 and the sixth current I6 based on the fourth current I4.

The load 216 receives the first supply voltage VDD instead of the second supply voltage VSS, and the second current I2, the fourth current I4, the fifth current I5, and the sixth current I6 are sunk from the load 216 instead of being sourced to the load 216. In such a scenario, the first load voltage VL1 may correspond to a difference between the first supply voltage VDD and a voltage drop across the load 216 when the fifth current I5 is sunk from the load 216. The second through fourth load voltages VL2-VL4 may be determined in a similar manner. Further, the coupling of the first and third terminals of the fourth transistor T4 may be swapped. In other words, the source terminal of the fourth transistor T4 may be coupled to the sensing element 210 and the drain terminal of the fourth transistor T4 may be coupled to the load 216 by way of the fifth switch S5. The operations of the remaining components of the temperature sensor 104 (e.g., the switching circuit 206, the enabling circuit 208, the biasing circuit 212, the voltage generator 214, the ADC 218, and the processing circuit 220) remain same as described above in FIG. 2.

Although FIGS. 2 and 3 illustrate that a bipolar transistor is utilized as the sensing element 210, the scope of the present disclosure is not limited to it. In various other embodiments, the sensing element 210 may correspond to various other temperature sensing circuits, without deviating from the scope of the present disclosure.

Figure 4A:
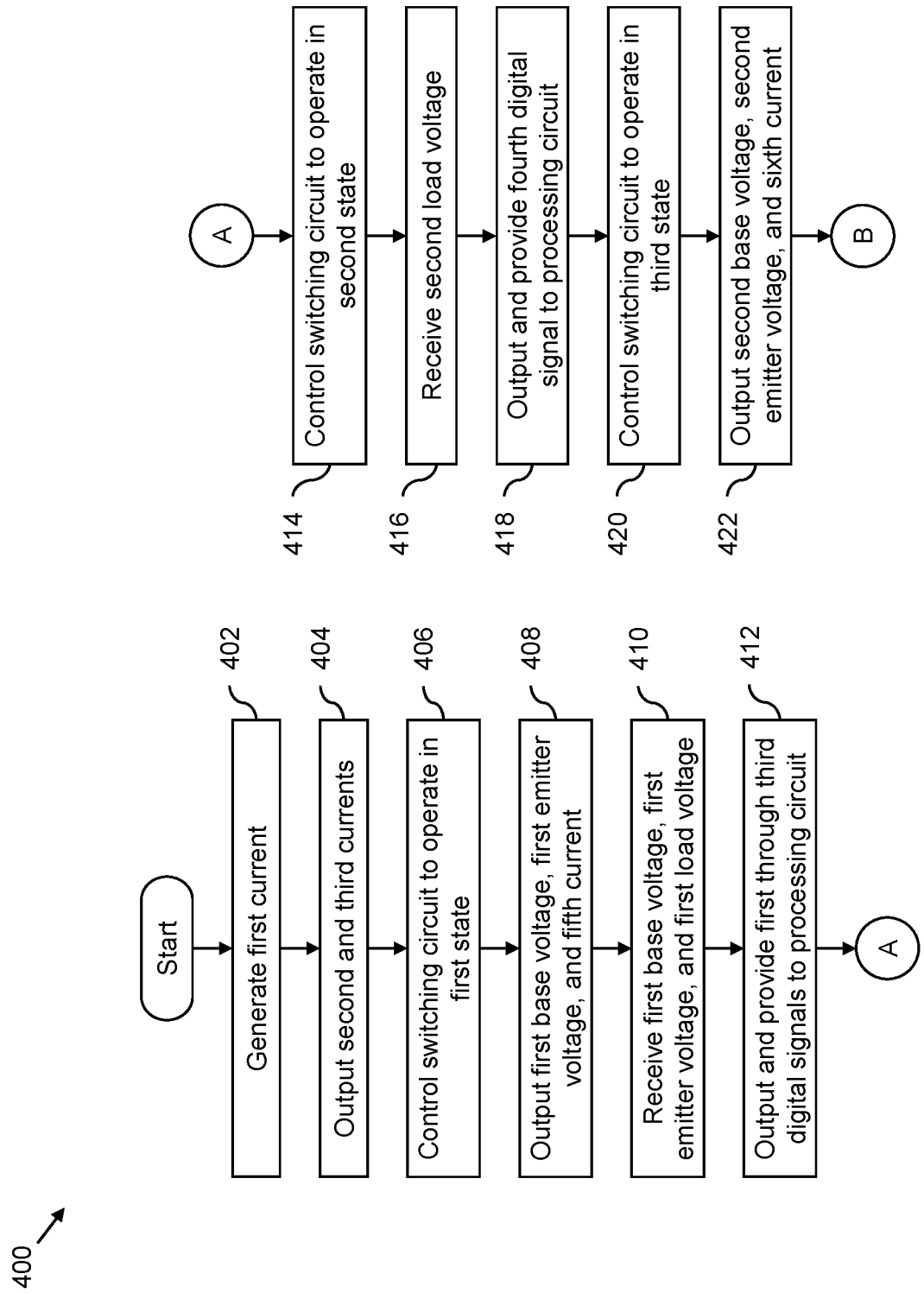
FIGS. 4A and 4B, collectively, represents a flowchart that illustrates a temperature sensing method in accordance with an embodiment of the present disclosure.
Figure 4B:
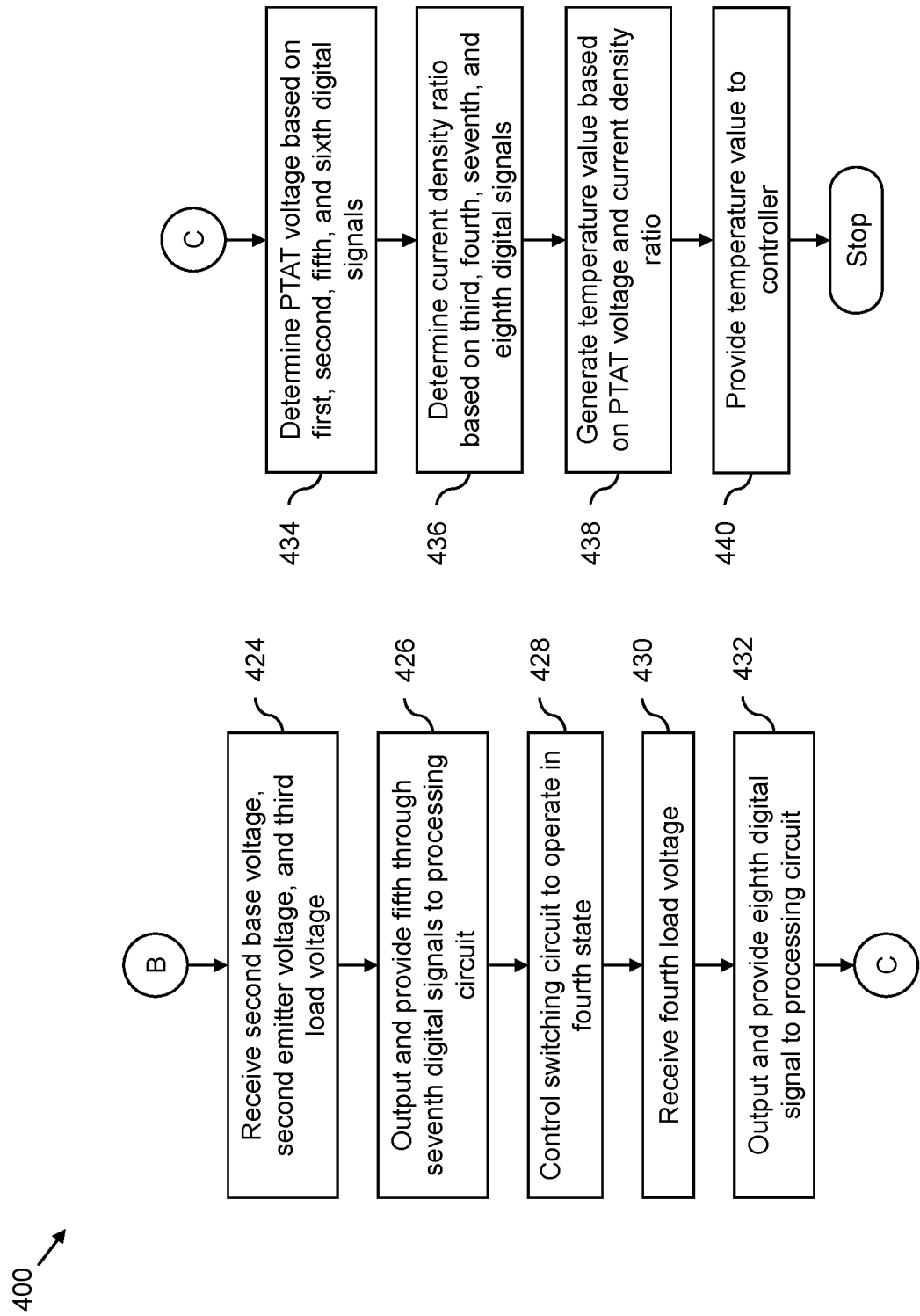

FIGS. 4A and 4B, collectively, represents a flowchart 400 that illustrates a temperature sensing method in accordance with an embodiment of the present disclosure. The temperature sensing method is implemented by the temperature sensor 104 for sensing the temperature of the IC 100 or a portion of the IC 100 that is in the vicinity of the temperature sensor 104.

Referring now to FIG. 4A, at step 402, the current source 202 may generate the first current I1. The first current I1 may be sourced to or sunk from the current control circuit 204. At step 404, the current control circuit 204 may output the second and third currents I2 and I3 based on the first current I1. The second and third currents I2 and I3 may be sourced to or sunk from the switching circuit 206 (e.g., the first data terminals of the third and fourth switches S3 and S4, respectively).

At step 406, the enabling circuit 208 may control the switching circuit 206 to operate in the first state. In other words, the first, third, and fifth switches S1, S3, and S5 are activated and the second and fourth switches S2 and S4 are deactivated. As a result, the second current I2 passes through the sensing element 210. At step 408, the sensing element 210 may output the first base voltage Vb1, the first emitter voltage Ve1, and the fifth current I5 (e.g., the first base current) based on the second current I2. The difference between the first base voltage Vb1 and the first emitter voltage Ve1 corresponds to the first CTAT voltage VCT1. The sensing element 210 may thus output the first CTAT voltage VCT1 and the fifth current I5 based on the second current I2. Further, the biasing circuit 212 ensures that the sensing element 210 is operational when the second current I2 passes through the sensing element 210. Further, the fifth current I5 passes through the load 216, by way of the fourth transistor T4 and the fifth switch S5, and results in the generation of the first load voltage VL1 across the load 216.

At step 410, the ADC 218 may receive the first base voltage Vb1 and the first emitter voltage Ve1 from the sensing element 210 and the first load voltage VL1 from the load 216. At step 412, the ADC 218 may output the first through third digital signals D1-D3 that are digital representations of the voltage levels of the first base voltage Vb1, the first emitter voltage Ve1, and the first load voltage VL1, respectively, and provide the first through third digital signals D1-D3 to the processing circuit 220.

At step 414, the enabling circuit 208 may control the switching circuit 206 to operate in the second state. In other words, the first, fourth, and fifth switches S1, S4, and S5 are deactivated and the second and third switches S2 and S3 are activated. As a result, the second current I2 passes through the load 216 and results in the generation of the second load voltage VL2 across the load 216. At step 416, the ADC 218 may receive the second load voltage VL2 from the load 216. At step 418, the ADC 218 may output the fourth digital signal D4 that is a digital representation of the voltage level the second load voltage VL2, and provide the fourth digital signal D4 to the processing circuit 220.

At step 420, the enabling circuit 208 may control the switching circuit 206 to operate in the third state. In other words, the first, third, fourth, and fifth switches S1, S3, S4, and S5 are activated and the second switch S2 is deactivated. As a result, the fourth current I4 passes through the sensing element 210. At step 422, the sensing element 210 may output the second base voltage Vb2, the second emitter voltage Ve2, and the sixth current I6 (e.g., the second base current) based on the fourth current I4. The difference between the second base voltage Vb2 and the second emitter voltage Ve2 corresponds to the second CTAT voltage VCT2. The sensing element 210 may thus output the second CTAT voltage VCT2 and the sixth current I6 based on the fourth current I4. Further, the biasing circuit 212 ensures that the sensing element 210 is operational when the fourth current I4 passes through the sensing element 210. Further, the sixth current I6 passes through the load 216, by way of the fourth transistor T4 and the fifth switch S5, and results in the generation of the third load voltage VL3 across the load 216.

Referring now to FIG. 4B, at step 424, the ADC 218 may receive the second base voltage Vb2 and the second emitter voltage Ve2 from the sensing element 210 and the third load voltage VL3 from the load 216. At step 426, the ADC 218 may output the fifth through seventh digital signals D5-D7 that are digital representations of the voltage levels of the second base voltage Vb2, the second emitter voltage Ve2, and the third load voltage VL3, respectively, and provide the fifth through seventh digital signals D5-D7 to the processing circuit 220.

At step 428, the enabling circuit 208 may control the switching circuit 206 to operate in the fourth state. In other words, the first and fifth switches S1 and S5 are deactivated and the second through fourth switches S2-S4 are activated. As a result, the fourth current I4 passes through the load 216 and results in the generation of the fourth load voltage VL4 across the load 216. At step 430, the ADC 218 may receive the fourth load voltage VL4 from the load 216. At step 432, the ADC 218 may output the eighth digital signal D8 that is a digital representation of the voltage level the fourth load voltage VL4, and provide the eighth digital signal D8 to the processing circuit 220.

At step 434, the processing circuit 220 may determine the PTAT voltage based on the first, second, fifth, and sixth digital signals D1, D2, D5, and D6. The PTAT voltage corresponds to the difference between the second and first CTAT voltages VCT2 and VCT1. At step 436, the processing circuit 220 may determine the current density ratio of the temperature sensor 104 based on the third, fourth, seventh, and eighth digital signals D3, D4, D7, and D8. At step 438, the processing circuit 220 may generate the temperature value TEM based on the PTAT voltage and the current density ratio. At step 440, the processing circuit 220 may provide the temperature value TEM to the controller 106. The controller 106 may perform various operations based on the temperature value TEM. For example, the temperature value TEM may be compared with the threshold limit, and when the temperature value TEM is greater than or equal to the threshold limit, the IC 100 may be shut down. As a result, the IC 100 is prevented from being damaged.

Conventionally, temperature sensors include two identical bipolar transistors through which two different currents are passed to obtain a PTAT voltage. A temperature value indicative of a temperature sensed by such a temperature sensor is determined based on the PTAT voltage and a current density ratio of the temperature sensor. The current density ratio is typically a constant value. The accuracy of the temperature sensing operation depends on a current source that generates various currents that are passed through the bipolar transistors as well as parameter matching between the two bipolar transistors. When the current source is faulty or there is a mismatch between the two bipolar transistors, the current density ratio changes. As the constant value of the current density is utilized for determining the temperature value, a faulty current source or a mismatch between the two bipolar transistors degrades the accuracy of the temperature sensor. To minimize the effect of the faulty current source and the mismatch between bipolar transistors, the dynamic element matching (DEM) technique is implemented in various conventional temperature sensors. In the DEM technique, different pairs of currents are passed through the two bipolar transistors and then the results (e.g., various PTAT voltages) are averaged out to obtain a final temperature value. The current density ratio however remains fixed in such cases. Hence, inaccuracy persists in the temperature sensing operation of such temperature sensors.

In the temperature sensor 104, a single bipolar transistor is utilized for sensing the temperature, thereby eliminating errors arising from the mismatch between two identical bipolar transistors. Further, the current density ratio and the PTAT voltage are determined in real-time. As a result, any variations in the current source 202 (or the current control circuit 204) or any variations introduced by the bipolar transistor when two different currents pass therethrough are compensated by the current density ratio that is determined in real-time. Hence, the accuracy of the temperature sensor 104 is significantly greater than that of conventional temperature sensors.

The term "coupled" as used herein, is not intended to be limited to a direct coupling or a mechanical coupling. Furthermore, the terms "a" or "an," as used herein, are defined as one or more than one.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A temperature sensor, comprising:
a sensing element configured to output, based on a first plurality of currents that passes through the sensing element, a plurality of complementary-to-absolute-temperature (CTAT) voltages and a second plurality of currents, wherein each current of the first plurality of currents is different; and
a load that is coupled to the sensing element, and has the first plurality of currents and the second plurality of currents pass therethrough, wherein a plurality of load voltages is generated across the load based on the first plurality of currents and the second plurality of currents, wherein a current density ratio of the temperature sensor is determined based on the plurality of load voltages, and wherein a temperature value indicative of a temperature sensed by the temperature sensor is generated based on (i) the current density ratio and (ii) the plurality of CTAT voltages.

2. The temperature sensor of claim 1, wherein the first plurality of currents comprises a first current and a second current that is different from the first current, wherein the sensing element outputs a first CTAT voltage and a third current based on the first current that passes through the sensing element, and the sensing element outputs a second CTAT voltage and a fourth current based on the second current that passes through the sensing element, wherein a first load voltage, a second load voltage, a third load voltage, and a fourth load voltage are generated across the load based on the third current, the first current, the fourth current, and the second current that pass through the load, respectively, wherein the plurality of CTAT voltages comprises the first CTAT voltage and the second CTAT voltage, the second plurality of currents comprises the third current and the fourth current, and the plurality of load voltages comprises the first load voltage, the second load voltage, the third load voltage, and the fourth load voltage, and wherein the temperature value is generated based on (i) the current density ratio and (ii) a difference between the second CTAT voltage and the first CTAT voltage.

3. The temperature sensor of claim 2, further comprising a switching circuit that is coupled to the sensing element and the load,
wherein when the switching circuit operates in a first state, (i) the first current passes through the sensing element, and the sensing element outputs the first CTAT voltage and the third current based on the first current, and (ii) the third current passes through the load, and the first load voltage is generated across the load based on the third current,
wherein when the switching circuit operates in a second state, the first current passes through the load, and the second load voltage is generated across the load based on the first current,
wherein when the switching circuit operates in a third state, (i) the second current passes through the sensing element, and the sensing element outputs the second CTAT voltage and the fourth current based on the second current, and (ii) the fourth current passes through the load, and the third load voltage is generated across the load based on the fourth current, and
wherein when the switching circuit operates in a fourth state, the second current passes through the load, and the fourth load voltage is generated across the load based on the second current.

4. The temperature sensor of claim 3, wherein the sensing element corresponds to a transistor that is configured to (i) output, based on the first current, a first base voltage, a first emitter voltage, and the third current, and (ii) output, based on the second current, a second base voltage, a second emitter voltage, and the fourth current, wherein a difference between the first base voltage and the first emitter voltage corresponds to the first CTAT voltage, and a difference between the second base voltage and the second emitter voltage corresponds to the second CTAT voltage, and wherein the third current and the fourth current correspond to a first base current and a second base current of the transistor that are outputted based on the first current and the second current, respectively.

5. The temperature sensor of claim 4, further comprising an analog-to-digital converter (ADC) that is coupled to the sensing element and the load, wherein when the switching circuit operates in the first state, the ADC is configured to receive the first base voltage, the first emitter voltage, and the first load voltage, and output a first digital signal, a second digital signal, and a third digital signal that are indicative of voltage levels of the first base voltage, the first emitter voltage, and the first load voltage, respectively, wherein when the switching circuit operates in the second state, the ADC is further configured to receive the second load voltage and output a fourth digital signal that is indicative of a voltage level of the second load voltage, wherein when the switching circuit operates in the third state, the ADC is further configured to receive the second base voltage, the second emitter voltage, and the third load voltage, and output a fifth digital signal, a sixth digital signal, and a seventh digital signal that are indicative of voltage levels of the second base voltage, the second emitter voltage, and the third load voltage, respectively, and wherein when the switching circuit operates in the fourth state, the ADC is further configured to receive the fourth load voltage and output an eighth digital signal that is indicative of a voltage level of the fourth load voltage.

6. The temperature sensor of claim 5, further comprising a processing circuit that is coupled to the ADC, and configured to:
  determine the difference between the second CTAT voltage and the first CTAT voltage based on the first digital signal, the second digital signal, the fifth digital signal, and the sixth digital signal, wherein the difference between the second CTAT voltage and the first CTAT voltage corresponds to a proportional-to-absolute-temperature (PTAT) voltage;
  determine the current density ratio based on the third digital signal, the fourth digital signal, the seventh digital signal, and the eighth digital signal; and
  generate the temperature value based on the PTAT voltage and the current density ratio.

7. The temperature sensor of claim 2, further comprising a switching circuit that is coupled to the sensing element and the load, wherein the switching circuit comprises:
  a first switch that is coupled to the sensing element;
  a second switch that is coupled to the load;
  a third switch that is coupled to the second switch, wherein the first current is one of a group consisting of sourced to and sunk from the third switch;
  a fourth switch that is coupled to the first switch, the second switch, and the third switch, wherein a scaled version of the first current is one of a group consisting of sourced to and sunk from the fourth switch; and
  a fifth switch that is coupled between the sensing element and the load.

8. The temperature sensor of claim 7, wherein when the first switch, the third switch, and the fifth switch are activated and the second switch and the fourth switch are deactivated, (i) the switching circuit operates in a first state, (ii) the first current passes through the sensing element such that the sensing element outputs the first CTAT voltage and the third current, and (iii) the third current passes through the load such that the first load voltage is generated across the load, and wherein when the second switch and the third switch are activated and the first switch, the fourth switch, and the fifth switch are deactivated, (i) the switching circuit operates in a second state and (ii) the first current passes through the load such that the second load voltage is generated across the load.

9. The temperature sensor of claim 7, wherein when the first switch, the third switch, the fourth switch, and the fifth switch are activated and the second switch is deactivated, (i) the switching circuit operates in a third state, (ii) the second current passes through the sensing element such that the sensing element outputs the second CTAT voltage and the fourth current, and (iii) the fourth current passes through the load such that the third load voltage is generated across the load, and wherein when the second switch, the third switch, and the fourth switch are activated and the first switch and the fifth switch are deactivated, (i) the switching circuit operates in a fourth state and (ii) the second current passes through the load such that the fourth load voltage is generated across the load.

10. The temperature sensor of claim 7, further comprising an enabling circuit that is coupled to the first switch, the second switch, the third switch, the fourth switch, and the fifth switch, and configured to generate (i) a first enable signal to activate and deactivate the first switch and the fifth switch, (ii) a second enable signal to activate and deactivate the second switch, (iii) a third enable signal to activate and deactivate the third switch, and (iv) a fourth enable signal to activate and deactivate the fourth switch.

11. The temperature sensor of claim 2, wherein the current density ratio is a ratio of (i) a difference between the fourth load voltage and the third load voltage and (ii) a difference between the second load voltage and the first load voltage.

12. The temperature sensor of claim 2, wherein the first current and the second current pass through the sensing element in a sequential manner.

13. The temperature sensor of claim 2, wherein the second current is equal to a sum of the first current and a scaled version of the first current.

14. The temperature sensor of claim 13, further comprising:
  a current source configured to generate a fifth current; and
  a current control circuit that is coupled to the current source, and configured to output the first current and the scaled version of the first current based on the fifth current, wherein the first current is a mirrored version of the fifth current.

15. The temperature sensor of claim 14, wherein the current control circuit comprises:
  a first transistor that has (i) a first terminal configured to receive a supply voltage and (ii) a second terminal and a third terminal coupled to each other and the current source, wherein the fifth current is one of a group consisting of sourced to and sunk from the third terminal of the first transistor;
  a second transistor that has (i) a first terminal configured to receive the supply voltage, (ii) a second terminal coupled to the second terminal of the first transistor, and (iii) a third terminal configured to output the first current; and
  a third transistor that has (i) a first terminal configured to receive the supply voltage, (ii) a second terminal coupled to the second terminal of the first transistor, and (iii) a third terminal configured to output the scaled version of the first current.

16. The temperature sensor of claim 1, further comprising a biasing circuit that is coupled to the sensing element, and configured to output a bias voltage and provide the bias voltage to the sensing element to control an operation of the sensing element, wherein a voltage level of the bias voltage is such that the sensing element is operational.

17. The temperature sensor of claim 16, wherein the biasing circuit comprises:
   a transistor that has a first terminal, a second terminal, and a third terminal, wherein the first terminal of the transistor is coupled to the load and the third terminal of the transistor is coupled to the sensing element; and
   an amplifier that has (i) a first input terminal coupled to the third terminal of the transistor, (ii) a second input terminal configured to receive the bias voltage, and (iii) an output terminal coupled to the second terminal of the transistor, wherein the transistor and the amplifier, coupled in a feedback configuration, are configured to output the bias voltage at the third terminal of the transistor.

18. The temperature sensor of claim 17, further comprising a voltage generator that is coupled to the second input terminal of the amplifier, and configured to generate the bias voltage and provide the bias voltage to the second input terminal of the amplifier.

19. A temperature sensing method, comprising:
   controlling, by an enabling circuit of a temperature sensor, a switching circuit of the temperature sensor to operate in a plurality of states; and
   outputting, by a sensing element of the temperature sensor, based on a first plurality of currents that passes through the sensing element when the switching circuit operates in two or more states of the plurality of states, a plurality of complementary-to-absolute-temperature (CTAT) voltages and a second plurality of currents,
      wherein each current of the first plurality of currents is different,
      wherein when the switching circuit operates in the plurality of states, the first plurality of currents and the second plurality of currents pass through a load of the temperature sensor and a plurality of load voltages is generated across the load,
      wherein a current density ratio of the temperature sensor is determined based on the plurality of load voltages, and
      wherein a temperature value indicative of a temperature sensed by the temperature sensor is generated based on (i) the current density ratio and (ii) the plurality of CTAT voltages.

20. The temperature sensing method of claim 19,
   wherein the first plurality of currents comprises a first current and a second current that is different from the first current,
   wherein when the switching circuit operates in a first state of the plurality of states, (i) the first current passes through the sensing element, and the sensing elements outputs a first CTAT voltage and a third current based on the first current, and (ii) the third current passes through the load, and a first load voltage is generated across the load,
   wherein when the switching circuit operates in a second state of the plurality of states, the first current passes through the load, and a second load voltage is generated across the load,
   wherein when the switching circuit operates in a third state of the plurality of states, (i) the second current passes through the sensing element, and the sensing elements outputs a second CTAT voltage and a fourth current based on the second current, and (ii) the fourth current passes through the load, and a third load voltage is generated across the load,
   wherein when the switching circuit operates in a fourth state of the plurality of states, the second current passes through the load, and a fourth load voltage is generated across the load,
   wherein the plurality of CTAT voltages comprises the first CTAT voltage and the second CTAT voltage, the second plurality of currents comprises the third current and the fourth current, and the plurality of load voltages comprises the first load voltage, the second load voltage, the third load voltage, and the fourth load voltage, and
   wherein the temperature value is generated based on (i) the current density ratio and (ii) a difference between the second CTAT voltage and the first CTAT voltage.

* * * * *